US011288716B1

(12) United States Patent
Porterfield et al.

(10) Patent No.: US 11,288,716 B1
(45) Date of Patent: Mar. 29, 2022

(54) SYSTEMS AND METHODS FOR DIGITAL WALLET TRANSIT PAYMENTS

(71) Applicant: JPMorgan Chase Bank, N.A., New York, NY (US)

(72) Inventors: James David Porterfield, Pipe Creek, TX (US); Ryan Andrew Schlosser, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 462 days.

(21) Appl. No.: 15/344,233

(22) Filed: Nov. 4, 2016

(51) Int. Cl.
*G06Q 30/02* (2012.01)
*G06Q 20/36* (2012.01)
(Continued)

(52) U.S. Cl.
CPC ....... *G06Q 30/0284* (2013.01); *G06Q 20/102* (2013.01); *G06Q 20/36* (2013.01); *H04W 4/40* (2018.02); *G06Q 50/30* (2013.01)

(58) Field of Classification Search
CPC ........ G06Q 20/36; G06Q 20/08; G06Q 20/32; G06Q 50/30; G06Q 20/40145; G06Q 2240/00; G06Q 30/0205; G06Q 20/102; G06Q 30/0284; H04W 4/029; G07B 13/00; G07B 13/08
(Continued)

(56) References Cited

U.S. PATENT DOCUMENTS

| 4,217,684 A | * | 8/1980 | Brisken ................. B06B 1/0622 |
| | | | 257/416 |
| 4,570,228 A | * | 2/1986 | Ahlberg ................. G07B 13/04 |
| | | | 235/45 |

(Continued)

FOREIGN PATENT DOCUMENTS

JP    WO 2009/098813    *    8/2009    ............. G06Q 50/00

OTHER PUBLICATIONS

Phiboonbanakit, Thananut; Horanont, Teerayut, "Who will get benefit from the new taxi fare rate?. Discerning the real driving data from Taxi GPS Data", 7th International Conference on Information Communication Technology for Embedded Systems, IEEE, 2016, pp. 1-6. (Year: 2016).*

(Continued)

*Primary Examiner* — Mohammad Z Shaikh
(74) *Attorney, Agent, or Firm* — Hunton Andrews Kurth LLP

(57) ABSTRACT

Systems and methods for digital wallet transit payments are disclosed. According to one embodiment, a method for managing transit payments using a digital wallet may include (1) receiving, at a receiver associated with a vehicle and at a first vehicle location, a first communication from a mobile electronic device associated with a traveler comprising an identification of a payment instrument from a traveler's digital wallet, the first communication received before the traveler begins a trip in the vehicle; (2) receiving, at the receiver and at second vehicle location, a second communication from a mobile device at a conclusion of the trip; (3) a computer processor calculating a fare based on a travelled distance between the first vehicle location and the second (Continued)

vehicle location; and (4) the computer processor automatically submitting a transaction request for the fare to an issuer of the payment instrument.

12 Claims, 3 Drawing Sheets

(51) Int. Cl.
  *G06Q 20/10* (2012.01)
  *H04W 4/40* (2018.01)
  *G06Q 50/30* (2012.01)
(58) Field of Classification Search
  USPC .................................................. 705/35–45
  See application file for complete search history.

(56) References Cited

U.S. PATENT DOCUMENTS

| | | | | | |
|---|---|---|---|---|---|
| 4,800,502 | A | * | 1/1989 | Stewart | G06Q 30/0284 235/30 R |
| 5,689,423 | A | * | 11/1997 | Sawada | G01C 21/3415 340/995.21 |
| 5,917,434 | A | * | 6/1999 | Murphy | G07B 13/02 340/991 |
| 6,087,965 | A | * | 7/2000 | Murphy | G07B 13/00 340/991 |
| 6,122,591 | A | * | 9/2000 | Pomerantz | G01C 21/34 701/410 |
| 6,873,974 | B1 | * | 3/2005 | Schutzer | G06Q 20/10 235/379 |
| 6,898,299 | B1 | * | 5/2005 | Brooks | G06K 9/00 340/5.52 |
| 7,331,522 | B2 | * | 2/2008 | Sandoval | G07B 15/04 235/382 |
| 7,562,818 | B1 | * | 7/2009 | Bierbaum | G07B 15/02 235/375 |
| 7,731,086 | B2 | * | 6/2010 | Saunders | G06Q 20/10 235/380 |
| 7,797,248 | B1 | * | 9/2010 | Bierbaum | G06Q 20/0652 705/1.1 |
| 8,118,223 | B2 | * | 2/2012 | Hammad | G06Q 20/045 235/375 |
| 8,225,997 | B1 | * | 7/2012 | Bierbaum | G06Q 20/0453 235/375 |
| 8,498,902 | B1 | * | 7/2013 | Kogen | G06Q 30/06 705/17 |
| 8,523,069 | B2 | * | 9/2013 | Hammad | G06Q 20/045 235/384 |
| 8,660,867 | B2 | * | 2/2014 | Krivopaltsev | G06Q 50/30 705/5 |
| 8,693,737 | B1 | * | 4/2014 | Newman | G06F 21/32 382/117 |
| 8,695,411 | B2 | * | 4/2014 | Okazawa | F01M 1/16 73/114.57 |
| 9,037,852 | B2 | * | 5/2015 | Pinkus | H04L 67/12 713/160 |
| 9,157,748 | B2 | * | 10/2015 | Millspaugh | G08G 1/13 |
| 9,230,292 | B2 | * | 1/2016 | Amin | G06Q 30/0641 |
| 9,558,487 | B2 | * | 1/2017 | Silbernagl | G06Q 20/04 |
| 9,785,920 | B2 | * | 10/2017 | Aaron | G06Q 20/02 |
| 9,857,188 | B1 | * | 1/2018 | O'Hare | G01C 21/3626 |
| 9,928,745 | B2 | * | 3/2018 | Backof, II | G08G 1/20 |
| 9,939,276 | B2 | * | 4/2018 | Cui | G01S 19/40 |
| 9,959,512 | B2 | * | 5/2018 | Camp | G06Q 10/06311 |
| 9,996,831 | B2 | * | 6/2018 | Dixon | G07B 15/02 |
| 10,009,306 | B2 | * | 6/2018 | Garg | G06Q 10/08 |
| 10,115,107 | B2 | * | 10/2018 | Kozloski | G06Q 20/34 |
| 10,249,013 | B2 | * | 4/2019 | Yang | G07B 15/02 |
| 10,282,919 | B2 | * | 5/2019 | Joo | G06Q 20/40 |
| 10,304,059 | B2 | * | 5/2019 | Ho | G06Q 20/40145 |
| 10,332,162 | B1 | * | 6/2019 | Brock | G06Q 30/0284 |
| 10,354,299 | B2 | * | 7/2019 | Kelly | G06Q 20/3278 |
| 11,049,124 | B2 | * | 6/2021 | Marueli | G06Q 50/30 |
| 2001/0037174 | A1 | * | 11/2001 | Dickerson | G08G 1/202 701/400 |
| 2002/0138423 | A1 | * | 9/2002 | Takatori | G06Q 20/04 705/39 |
| 2002/0194137 | A1 | * | 12/2002 | Park | G06Q 20/322 705/64 |
| 2003/0036355 | A1 | * | 2/2003 | Gundlach | G06Q 20/0652 455/41.1 |
| 2003/0054837 | A1 | * | 3/2003 | Ennis | G08G 1/202 455/456.1 |
| 2003/0065556 | A1 | * | 4/2003 | Takanashi | G08G 1/202 705/13 |
| 2005/0004757 | A1 | * | 1/2005 | Neeman | G01C 21/3423 701/414 |
| 2005/0153707 | A1 | * | 7/2005 | Ledyard | G01S 5/0018 455/456.1 |
| 2006/0059023 | A1 | * | 3/2006 | Mashinsky | G06Q 10/02 705/5 |
| 2008/0116264 | A1 | * | 5/2008 | Hammad | G06Q 20/045 235/382 |
| 2008/0201212 | A1 | * | 8/2008 | Hammad | G07F 17/0014 705/13 |
| 2008/0208681 | A1 | * | 8/2008 | Hammad | G06Q 20/045 705/13 |
| 2008/0277183 | A1 | * | 11/2008 | Huang | B60R 25/33 180/271 |
| 2009/0210299 | A1 | * | 8/2009 | Cowen | G06Q 20/4037 705/13 |
| 2010/0042546 | A1 | * | 2/2010 | Humbel | G06Q 10/02 705/64 |
| 2010/0197325 | A1 | * | 8/2010 | Dredge | H04L 67/18 455/456.3 |
| 2010/0243724 | A1 | * | 9/2010 | Golla | G07B 13/00 235/30 R |
| 2010/0268450 | A1 | * | 10/2010 | Evanitsky | G01C 21/3423 701/533 |
| 2011/0047037 | A1 | * | 2/2011 | Wu | G07C 5/008 705/17 |
| 2011/0060600 | A1 | * | 3/2011 | Fox | G01S 19/51 705/1.1 |
| 2011/0137773 | A1 | * | 6/2011 | Davis, III | G01G 19/4142 705/34 |
| 2011/0153453 | A1 | * | 6/2011 | Ghafoor | G06Q 10/02 705/26.9 |
| 2011/0165866 | A1 | * | 7/2011 | Dixon | G06Q 10/08 455/414.1 |
| 2011/0166995 | A1 | * | 7/2011 | Fuerstenberg | G07C 9/29 705/40 |
| 2011/0227758 | A1 | * | 9/2011 | Liu | H04W 4/42 340/905 |
| 2012/0023033 | A1 | * | 1/2012 | Tomasz | G06Q 30/0208 705/345 |
| 2012/0046040 | A1 | * | 2/2012 | Chatterjee | H04W 24/10 455/456.1 |
| 2012/0101942 | A1 | * | 4/2012 | Park | G07B 15/02 705/40 |
| 2012/0191491 | A1 | * | 7/2012 | Choi | G06Q 10/02 705/5 |
| 2012/0278137 | A1 | * | 11/2012 | Dixon | G06Q 20/322 705/13 |
| 2013/0173357 | A1 | * | 7/2013 | Lishak | G06Q 10/00 705/13 |
| 2013/0182845 | A1 | * | 7/2013 | Monica | H04L 63/0869 380/270 |
| 2013/0185124 | A1 | * | 7/2013 | Aaron | G07B 13/02 705/13 |
| 2013/0185208 | A1 | * | 7/2013 | Aaron | G07B 15/02 705/44 |
| 2013/0196638 | A1 | * | 8/2013 | Kim | H04W 4/023 455/414.1 |
| 2013/0253996 | A1 | * | 9/2013 | Single | G06Q 50/30 705/13 |
| 2013/0290443 | A1 | * | 10/2013 | Collins | G06Q 10/107 709/206 |

(56) References Cited

U.S. PATENT DOCUMENTS

| | | | |
|---|---|---|---|
| 2014/0019340 A1* | 1/2014 | Ruder | G06Q 20/4016 705/39 |
| 2014/0038640 A1* | 2/2014 | Wesselius | G08G 1/202 455/456.1 |
| 2014/0067488 A1* | 3/2014 | James | G06Q 30/02 705/13 |
| 2014/0074757 A1* | 3/2014 | De Gennaro | G07B 13/04 705/417 |
| 2014/0149189 A1* | 5/2014 | Gauer | G07B 15/02 705/13 |
| 2014/0379391 A1* | 12/2014 | Lulic | G06Q 20/40 705/5 |
| 2015/0028996 A1* | 1/2015 | Agrafioti | G06F 21/40 340/5.82 |
| 2015/0066558 A1* | 3/2015 | Kimiagar | G06Q 10/06313 705/7.17 |
| 2015/0081362 A1* | 3/2015 | Chadwick | G06Q 10/06311 705/7.14 |
| 2015/0095122 A1* | 4/2015 | Eramian | G07B 15/00 705/13 |
| 2015/0095197 A1* | 4/2015 | Eramian | G06Q 30/0284 705/26.64 |
| 2015/0154578 A1* | 6/2015 | Aggarwal | G07B 15/063 705/13 |
| 2015/0227923 A1* | 8/2015 | Kutsch | G06Q 20/3674 705/67 |
| 2015/0235477 A1* | 8/2015 | Simkin | G07B 15/02 705/417 |
| 2015/0294298 A1* | 10/2015 | Michishita | G06Q 50/30 705/13 |
| 2015/0310510 A1* | 10/2015 | Kelly | G07B 13/00 705/13 |
| 2016/0031459 A1* | 2/2016 | Murren | B61L 15/0027 701/22 |
| 2016/0125662 A1* | 5/2016 | Fujita | G07B 15/02 705/13 |
| 2016/0142964 A1* | 5/2016 | Todasco | H04W 48/00 455/41.2 |
| 2016/0162895 A1* | 6/2016 | Nuzum | G06Q 20/3226 705/44 |
| 2016/0320195 A1* | 11/2016 | Liu | G01C 21/3438 |
| 2016/0379141 A1* | 12/2016 | Judge | G07B 15/02 705/5 |
| 2017/0061441 A1* | 3/2017 | Kamal | G06Q 20/40145 |
| 2017/0098184 A1* | 4/2017 | Marco | G08G 1/202 |
| 2017/0124550 A1* | 5/2017 | Oberli | G07B 15/02 |
| 2017/0124671 A1* | 5/2017 | Tam | G06Q 20/047 |
| 2017/0132540 A1* | 5/2017 | Haparnas | G06Q 10/06311 |
| 2017/0169639 A1* | 6/2017 | Frye | G07C 9/00158 |
| 2017/0365030 A1* | 12/2017 | Shoham | G06Q 10/02 |
| 2018/0068301 A1* | 3/2018 | Abdulrahiman | G06Q 20/322 |
| 2018/0137583 A1* | 5/2018 | Mccorry | G06Q 20/0453 |
| 2019/0385201 A1* | 12/2019 | Kelly | G06Q 20/40 |

OTHER PUBLICATIONS

H. Sun and S. McIntosh, "Big Data Mobile Services for New York City Taxi Ridersand Drivers," 2016 IEEE International Conference on Mobile Services (MS), 2016, pp. 57-64, (Year: 2016).*

T. Phiboonbanakit and T. Horanont, "Who will get benefit from the new taxi fare rate? Discerning the real driving from Taxi GPS data," 2016 7th International Conference of Information and Communication Technology for Embedded Systems (IC-ICTES), 2016, pp. 73-78, (Year: 2016).*

* cited by examiner

SYSTEMS AND METHODS FOR DIGITAL WALLET TRANSIT PAYMENTS

BACKGROUND OF THE INVENTION

1. Field of the Invention

The present invention generally relates to systems and methods for digital wallet transit payments.

2. Description of the Related Art

Users often pay for transportation services using an account that is linked to their mobile devices. For example, following a trip, a Uber rider will have the fare charged to the payment instrument of record based on a combination of distance, time, and demand.

SUMMARY OF THE INVENTION

Systems and methods for digital wallet transit payments are disclosed. According to one embodiment, a method for managing transit payments using a digital wallet may include (1) receiving, at a receiver associated with a vehicle and at a first vehicle location, a first communication from a mobile electronic device associated with a traveler comprising an identification of a payment instrument from a traveler's digital wallet, the first communication received before the traveler begins a trip in the vehicle; (2) receiving, at the receiver and at second vehicle location, a second communication from a mobile device at a conclusion of the trip; (3) a computer processor calculating a fare based on a travelled distance between the first vehicle location and the second vehicle location; and (4) the computer processor automatically submitting a transaction request for the fare to an issuer of the payment instrument.

In one embodiment, the first communication may include identification information for the traveler. The identification information may include a traveler biometric.

In one embodiment, the method may further include verifying an identity of the traveler based on the identification information.

In one embodiment, the first vehicle location and the second vehicle location may be determined based on locations of the mobile electronic device.

In one embodiment, the computer processor is located remotely from the vehicle, and the receiver communicates the first communication and the second communication to the computer processor over a communication network.

According to another embodiment, a method for managing transit payments using a digital wallet may include (1) a mobile application executed by a mobile electronic device comprising at least one computer processor communicating, to a receiver associated with a vehicle, a first communication comprising an identification of a payment instrument from a digital wallet, the first communication received before the traveler begins a trip in the vehicle at a first vehicle location; (2) the mobile application receiving a fare structure for the trip from the receiver; (3) the mobile application using a location-sensing device in the mobile electronic device to monitor the vehicle's trip progress; (4) the mobile application calculating, substantially in real-time, a current estimated fare based on the fare structure and the vehicle's trip progress; (5) the mobile application displaying trip data based on the trip progress and the fare data, the trip data comprising a current vehicle location and a current estimated fare; (6) the mobile application communicating, to the receiver, a second communication at a conclusion of the trip at a second vehicle location; (7) the mobile application displaying an expected total fare based on the fare structure and a distance traveled between the first vehicle location and the second vehicle location; and (8) the mobile application receiving an actual fare charge for the trip.

In one embodiment, the method may further include the mobile application determining that the actual fare charge is greater than the expected total fare by a predetermined amount; and the mobile application automatically submitting a dispute to an issuer of the financial instrument. In one embodiment, the dispute may be submitted through a digital wallet application executed by the mobile electronic device.

In one embodiment, the mobile application may receive the actual charge from an application associated with the digital wallet, from an issuer of the financial instrument, etc.

In one embodiment, the first communication may further comprise identification information for the traveler.

In one embodiment, the identification information may include at least one traveler biometric.

According to another embodiment, a method for managing transit payments using a digital wallet may include (1) receiving, at a first receiver located at an entrance to a transit system, a first communication from a mobile electronic device associated with a traveler comprising an identification of a payment instrument from a traveler's digital wallet; (2) receiving, at a second receiver located at an exit of the transit system, a second communication from the mobile electronic device at a conclusion of the trip; (3) a transit system computer processor calculating a fare based on the location of the first receiver, the location of the second receiver, and a fare structure; and (4) the transit system computer processor submitting a transaction request for the fare to an issuer of the payment instrument.

In one embodiment, the first communication may include identification information for the traveler. The identification information may include a traveler biometric.

In one embodiment, the method may further include the transit system computer processor verifying an identity of the traveler based on the identification information.

In one embodiment, the method may further include the transit system computer processor communicating the fare to the mobile electronic device.

In one embodiment, the method may further include the transit system computer processor receiving a dispute notification from the issuer of the payment instrument.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
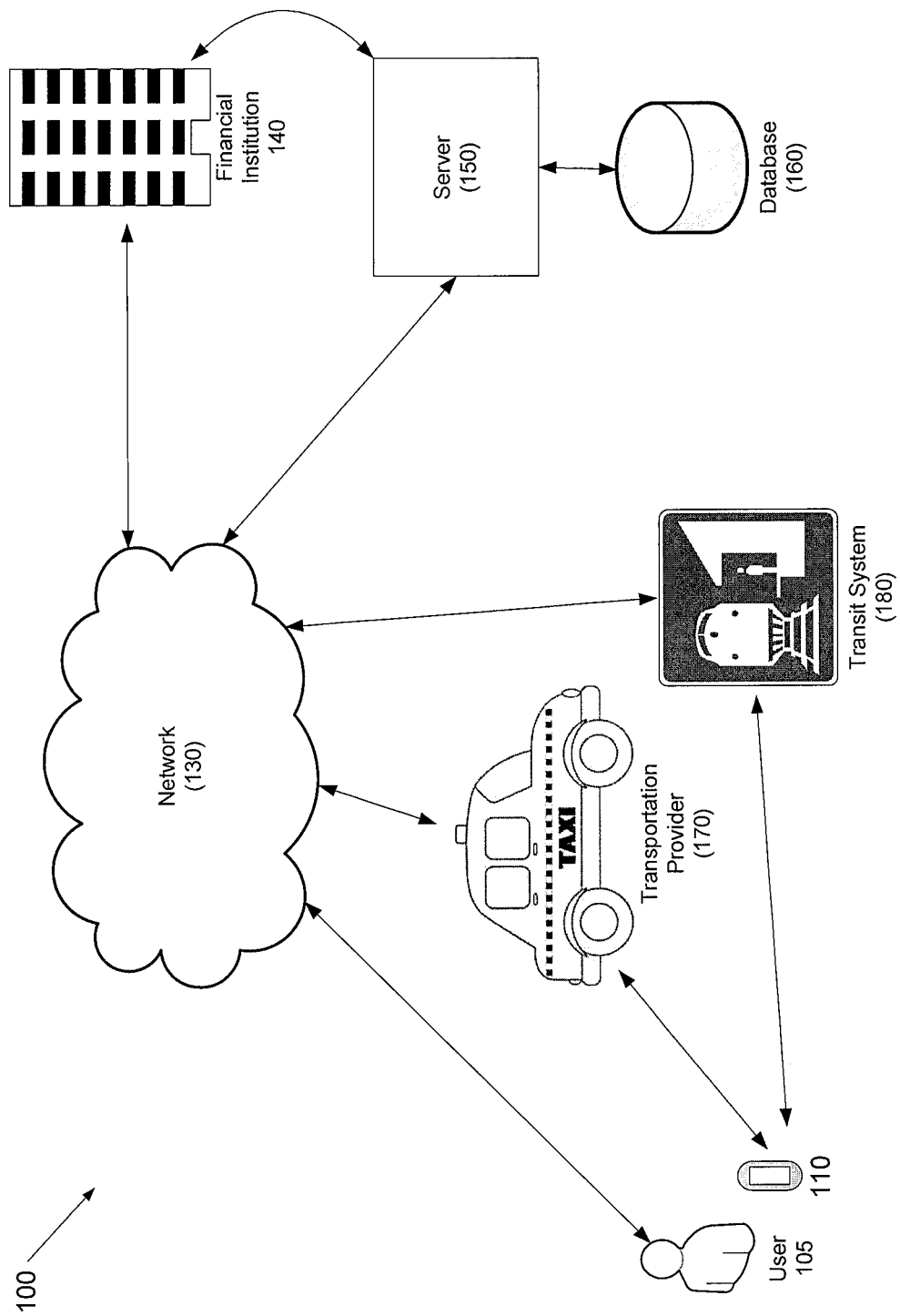
FIG. 1 is a block diagram of a system for digital wallet transit payments according to one embodiment.
Figure 2:
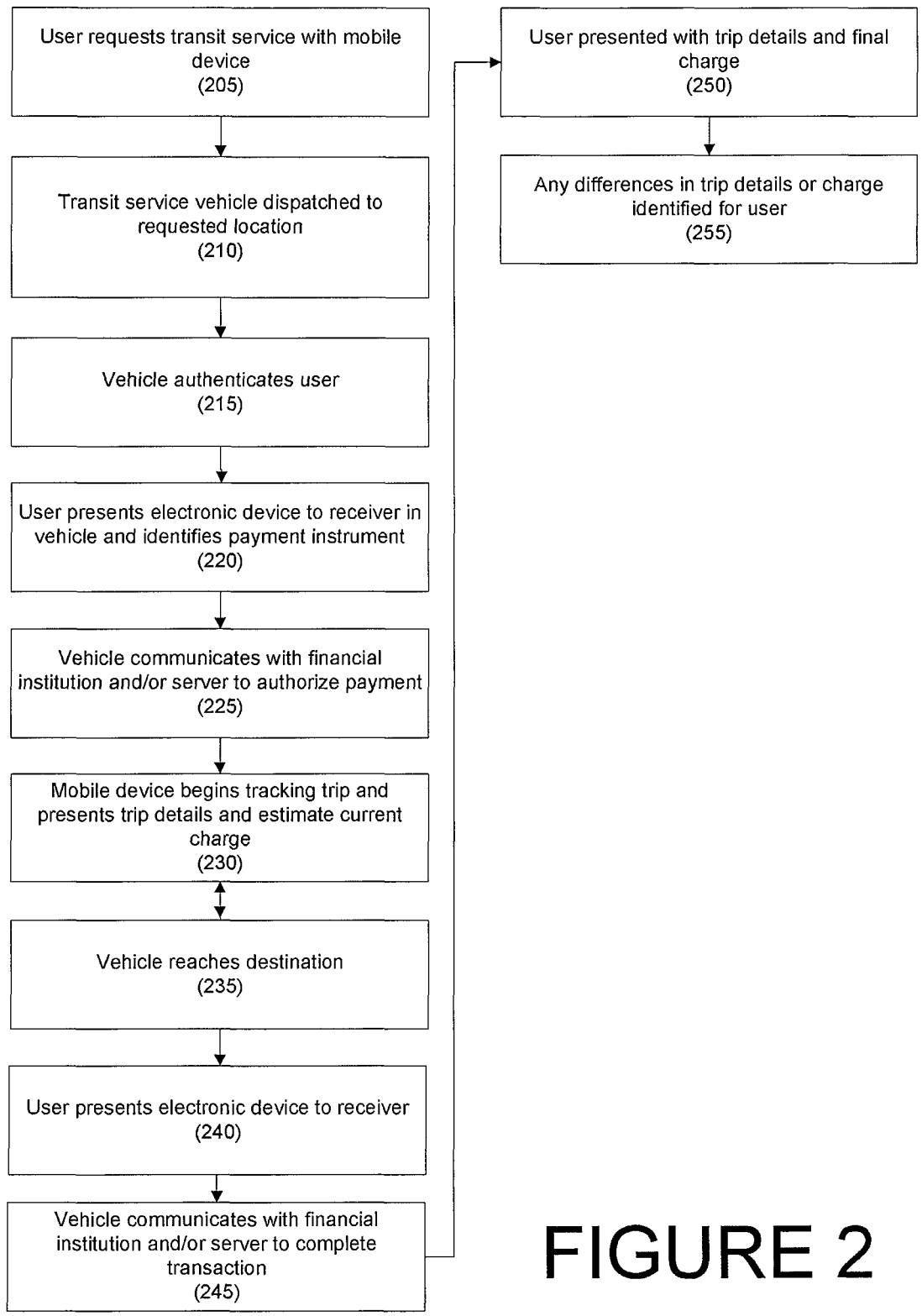
FIG. 2 depicts a method for digital wallet transit payments with a transit provider according to one embodiment.
Figure 3:
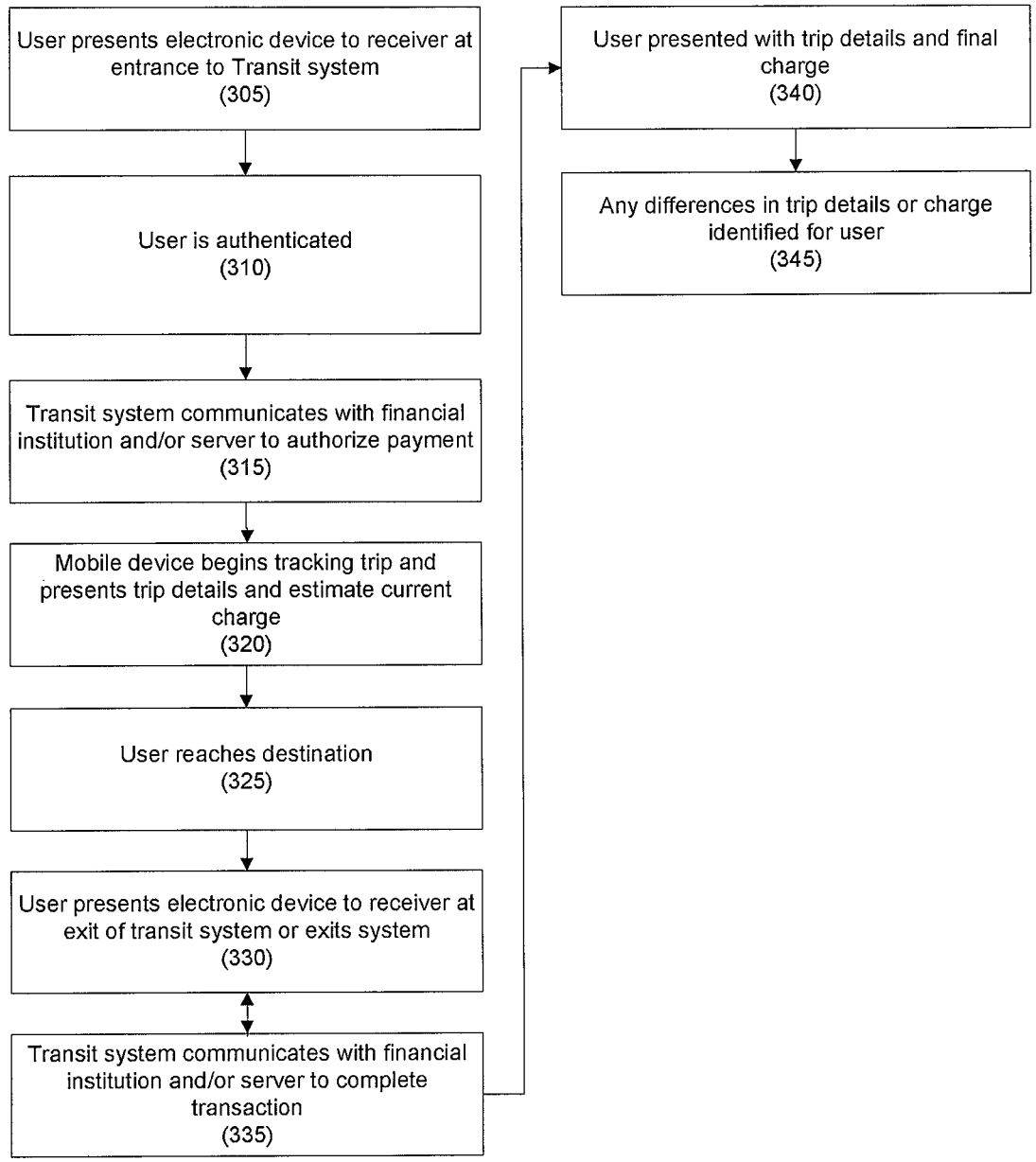
FIG. 3 depicts a method for digital wallet transit payments in a transit system according to one embodiment.

Several embodiments of the present invention and their advantages may be understood by referring to FIGS. 1-3.

Embodiments are directed to systems and methods for digital wallet transit payments.

In embodiments, using both hardware and software components, users may interact with means of transportation using, for example, a NFC or similar chip common to most new mobile electronic devices. A receiver that may be NFC (or similar) capable may be connected to one or more network, including the Internet. When a user taps their mobile electronic device on the receiver, the device is able to connect to a user's digital wallet and allow the appropriate transit authority to hold funds from the wallet. When the user reaches their destination, they simply tap the same receiver (if the receiver is vehicle-based) or a different receiver (if a receiver is provided at an entrance and exits, such as in a train terminal), and the appropriate fare may be deducted from the user's digital wallet.

The user's mobile electronic device may be provided with an interface that may inform the user of the distance that the user has traveled and the approximate cost. The location services on the user's mobile electronic device may also verify that the correct fare is being charged.

Additionally, further authentication protocols may ensure that the correct user is utilizing certain forms of transportation. For example, if a first user requests a taxi, the first user's mobile electronic device and the taxi's receiver may exchange one-use keys to and ensure that the correct user is picked up.

FIG. 1 depicts a system for digital wallet transit payments according to one embodiment. User 105 may access transit provider 170, transit system 180, etc. In one embodiment, transit provider 170 may provide a vehicle (e.g., taxi, hired vehicle, autonomous vehicle, bus, personal vehicle, airplane, helicopter, etc.) that may include a receiver (not shown) that may interact with user 105's mobile device 110. Transit system 180 may provider a first receiver at an entrance to transit system 180, and at an exit to transit station 180. Additional receivers may be provided. Examples of transmit system 180 include train networks, light rail networks, ferries, etc.

In another embodiment, transit system 180 may have only one receiver, either at the entrance or exit, and may charge a fixed fare regardless of distance travelled. In still another embodiment, transit system 180 may have two receivers but may charge a fixed fare regardless of distance travelled.

In one embodiment, transit provider 170 and/or transit system 180 may include equipment to authenticate the user, including cameras, biometric sensors, keypads, touch screens, etc. In one embodiment, transit provider 170 may use on-board authentication during the trip including, for example, voice recognition, signature or other behavioral biometric-based authentication, iris recognition, etc. In one embodiment, existing authentication, or additional authentication, from a user's mobile phone or other trusted personal device may be factored into the authentication process.

The receiver (not shown) may be any suitable device that may interact with mobile device 110. In one embodiment, the receiver and mobile device 110 may communicate wireless, for example, using radio frequency communication (e.g., NFC, Bluetooth, WiFi, etc.). Other means of communication, including optical communication, audio communication, etc. may be used as necessary and/or desired.

User 105, mobile device 110, transit provider 170, and transit system 180 may communicate with financial institution 140 and/or server 170 via network(s) 130. Network(s) 130 may include one or more payment network and communication network.

Financial institution 140 may be any suitable financial institution with which user 105 may have an account, such as a credit card account, a checking account, a savings, account, etc. In one embodiment, financial institution 140 may maintain a digital wallet for user 105 that may be accessed using mobile device 110. In one embodiment, the mobile wallet may include any suitable account that may be used to make a payment, including non-traditional payment accounts, such as home equity lines of credit.

Server 150 may be hosted by financial institution 140, or it may be hosted by a third party (not shown). In one embodiment, server 140 may interact with mobile device 110 to track user activity and to execute payments based on the user activity.

In one embodiment, server 150 may further include a dispute mechanism (not shown). In one embodiment, the dispute mechanism may be activate when a charge from a provider (e.g., transit provider 170 or transit system 180) is outside of an expected range, a margin of error, etc. The dispute mechanism may involve, for example, automatically disputing a charge, referring the charge to a third party, assisting user 105 in submitting a dispute, etc.

In one embodiment, the dispute may be submitted directly to financial institution 140. In another embodiment, the dispute may be submitted through a digital wallet application executed by mobile electronic device 110. Other ways of submitting the dispute may be used as is necessary and/or desired.

In one embodiment, the dispute may be automatically using system-based rules. In another embodiment, the dispute may be processed by a customer service agent. In still another embodiment, a combination of the two may process a dispute.

FIG. 2 depicts a method for digital wallet transit payments with a transit provider according to one embodiment.

In step 205, a user may request a transit service using the user's mobile electronic device. In one embodiment, the user may request the transit service at a location associated with the mobile electronic device's GPS coordinates; in another embodiment, the user may request the transit service at a different coordinates.

In one embodiment, identifying information for the user and/or mobile electronic device may be provided to the transit system.

In one embodiment, instead of requesting the transit service in advance, the user may instead summon a transit service vehicle similar to hailing a cab.

In step 210, the transit system may dispatch a vehicle to the requested location. In one embodiment, the transit system may provide the dispatched vehicle with information sufficient to authenticate the user independent of the transit service and/or the mobile wallet issuer.

In step 215, the user may approach the vehicle and may be authenticated. In one embodiment, the transit vehicle systems may authenticate the user using information provided by the transit system. In another embodiment, the transit vehicle may capture identifying information (e.g., device identifier, biometric (e.g., fingerprint, facial feature, voice, etc.) and communicate that information to the transit system and/or the issuer of the user's mobile wallet for authentication. For example, face recognition-based authentication using onboard cameras, voice recognition using microphones, finger or palm printing based biometric authentication using finger/palm scanners, iris biometrics using iris scanners, behavioral and multimodal biometrics using multiple channels such as video (e.g., motion biometrics), or using full or partial authentication from users mobile devices, passwords, or any combination of these, may be used as necessary and/or desired.

Examples of authentication are disclosed in U.S. patent application Ser. No. 14/554,930.

In one embodiment, if the vehicle is an autonomous vehicle, access to the vehicle may be prevented until the user is authenticated. At that point, the doors may be opened.

In step 220, the user may present his or her mobile electronic device to a receiver provided in the vehicle. The receiver may communicate with the mobile electronic device in any suitable manner.

In step 225, the vehicle may communicate with a server and/or financial institution to authorize a transaction. In one embodiment, the transaction may be authorized for an amount expected for a trip if a destination was provided; otherwise, a standard amount may be authorized.

In step 230, the mobile device may monitor the trip using, for example, its location determination system (e.g., GPS sensor), clock, etc. In one embodiment, the mobile electronic device may retrieve a fare chart for the transit provider and may receive any fare modifiers (e.g., price increases based on demand or weather, airport fees, etc.). The mobile electronic device may present trip data (e.g., time in vehicle, distance, and estimated fare) to the user during the trip. In one embodiment, it may further present an expected fare for the trip based on the destination. This expected fare may change as the trip progresses.

In one embodiment, the user's location may be presented on a map, along with the start point and expected end point for the trip.

In one embodiment, the doors the vehicle may be locked and remain locked until the vehicle reaches its destination. Additional security measures, such as those described in U.S. patent application Ser. No. 14/554,930 (e.g., video/behavioral monitoring, shutting down vehicle, communicating with authorities, etc.) may be used as necessary and/or desired, in particular, with autonomous vehicles.

In step 235, the vehicle may reach its destination, and, in step 240, the user may present the mobile electronic device to the receiver as the user exits the vehicle. In one embodiment, if the user forgets to present the mobile electronic device to the receiver, the receiver and/or mobile electronic device may detect the user leaving the vehicle by, for example, a loss of signal between the two. Other techniques may be used as is necessary and/or desired.

In step 245, the vehicle may communicate trip details and a charge to the financial institution and/or server to complete the transaction.

In step 250, the user's mobile electronic device may receive a receipt with trip details and the charge from the receiver and/or the financial institution/server.

In step 255, the user's mobile electronic device may compare the expected fare to the charged fare, and may alert the user of any differences outside of a margin of error.

In one embodiment, a dispute mechanism may be provided when the charged fare is outside a margin of error, or expected range, of the expected fare. For example, the user may automatically be presented with an electronic, prepopulated form to submit to the provider. As another example, the issuer of the financial instrument may hold the transaction pending the resolution of the dispute. As yet another example, the dispute may be referred to a third party for arbitration or other resolution.

In one embodiment, the dispute may be automatically using system-based rules. In another embodiment, the dispute may be processed by a customer service agent. In still another embodiment, a combination of the two may process a dispute.

FIG. 3 depicts a method for digital wallet transit payments in a transit system according to one embodiment.

In step 305, a user may present a mobile electronic device to a receiver at an entrance to a transit system, such as a rail network, ferry, etc.

In one embodiment, the user may identify the financial instrument in the user's digital wallet that will be used to pay for the trip.

In step 310, the user may be authenticated. For example, the user may present a biometric, as discussed above, to the receiver directly or using the mobile electronic device. The transit system and/or the financial institution/server may authenticate the user.

In step 315, the transit system may communicate with a server and/or financial institution to authorize a transaction. This may be similar to step 225, above.

In one embodiment, if distance and/or time in the transit system do not affect the fare (e.g., fixed fare), then the transit system may charge the financial instrument and provide a receipt to the user's mobile electronic device. While the mobile electronic device may monitor the trip, the process may continue with step 345.

In step 320, the mobile device may monitor the trip using, for example, its location determination system (e.g., GPS sensor), clock, etc. This may be similar to step 230, above. Within the transit system, the GPS signal may not be available, so other location determining technology may be used as necessary and/or desired.

In one embodiment, the mobile electronic device may retrieve a fare chart for the transit system and may receive any fare modifiers (e.g., discounts, rush hour fares, etc.). The mobile electronic device may present trip data (e.g., time in system, distance/number of stops travelled, and estimated fare) to the user during the trip. In one embodiment, it may further present an expected fare for the trip based on the destination.

In one embodiment, the user's location may be presented on a map, along with the start point and expected end point for the trip.

In step 325, the user may reach the destination, and, in step 330, the user may present the mobile electronic device to a receiver at the exit of the transit system. In one embodiment, if the user forgets to present the mobile electronic device to the receiver, the mobile electronic device may detect the user leaving the transit system based on the user's location. Other techniques may be used as is necessary and/or desired.

In another embodiment, the user may not need to present the mobile electronic device to a receiver at the exit.

In 335, the transit system may communicate trip details and a charge to the financial institution and/or server to complete the transaction.

In step 340, the user's mobile electronic device may receive a receipt with trip details and the charge from the receiver and/or the financial institution/server.

In step 345, the user's mobile electronic device may compare the expected fare to the charged fare, and may alert the user of any differences outside of a margin of error.

Although several embodiments have been disclosed, it should be recognized that the embodiments are not necessarily exclusive.

The following disclosures are hereby incorporated, by reference, in their entireties: U.S. Provisional Patent Application Ser. No. 62/024,310; U.S. Provisional Patent Application Ser. No. 62/024,407, U.S. Provisional Patent Application Ser. No. 62/024,272; U.S. Provisional Patent Application Ser. No. 62/024,398; U.S. patent application Ser. No. 14/554,930; and U.S. patent application Ser. No. 14/555,083.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized computer processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for managing transit payments using a digital wallet, comprising:

receiving, by a receiver associated with a vehicle and at a first vehicle location, a first communication from a mobile electronic device associated with a traveler, over a communications network, comprising an identification of a payment instrument from a traveler's digital wallet, the first communication received before the traveler begins a trip in the vehicle, wherein current GPS (Global Positioning System) coordinates of the mobile electronic device are received during the first communication;

permitting, by a computer processor, located remotely from the vehicle, access to the traveler onto the vehicle when an identity of the traveler is authenticated based on the first communication;

receiving, by the receiver and at second vehicle location, a second communication from the mobile electronic device, over the communications network, such that receiving the second communication concludes the trip, wherein current GPS coordinates of the mobile electronic device are received during the second communication;

detecting a location of the traveler exiting the vehicle based on the current GPS coordinates of the mobile electronic device during the second communication:

detecting a loss of signal between the receiver and the mobile electronic device based on the location of the traveler exiting the vehicle and in response to failing to receive the second communication;

determining that the trip has concluded based on the detected loss of signal and the failed second communication;

calculating by the computer processor a fare based on a travelled distance between the first vehicle location and the second vehicle location based on the GPS coordinates of the mobile electronic device during the first and second communications, and upon conclusion of the trip determined by either receiving the second communication or by detecting the loss of signal;

automatically submitting by the computer processor a transaction request for the fare to an issuer of the payment instrument;

charging, by the issuer of the payment instrument, the fare based on the transaction request;

determining, by a mobile application associated with the mobile electronic device, in real-time, an estimated fare based on the GPS coordinates ascertained by the mobile electronic device during the first and second communications;

displaying, by the mobile application, the estimated fare on the mobile electronic device;

receiving, by the mobile application, the fare charged to the payment instrument;

comparing, by the mobile application, the submitted transaction request with the estimated fare; and automatically submitting, by the mobile application, a dispute to the issuer of the payment instrument when the fare charged deviates from the estimated fare outside of a margin of error.

2. The method of claim 1, wherein the first communication further comprises identification information for the traveler.

3. The method of claim 2, further comprising:
the computer processor verifying the identity of the traveler based on the identification information.

4. The method of claim 3, wherein the identification information comprises at least one traveler biometric.

5. The method of claim 4, wherein the at least one traveler biometric is received from biometric sensing equipment of the vehicle.

6. A method for managing transit payments using a digital wallet, comprising:
receiving, by a first receiver located at an entrance to a transit system, a first communication from a mobile electronic device associated with a traveler, over a communications network, comprising an identification of a payment instrument from a traveler's digital wallet, wherein current GPS (Global Positioning System) coordinates of the mobile electronic device are received during the first communication;

permitting, by a transit system computer processor, access to the traveler onto the transit system when an identity of the traveler is authenticated based on the first communication;

receiving, a second receiver located at an exit of the transit system, a second communication from the mobile electronic device, over the communications network, at a conclusion of the trip, wherein the transit system computer processor is located remotely from the first and second receivers and such that receiving the second communication concludes the trip, wherein current GPS coordinates of the mobile electronic device are received during the second communication;

detecting a location of the traveler exiting the transit system based on the current GPS coordinates of the mobile electronic device during the second communication;

detecting a loss of signal between the second receiver and the mobile electronic device based on the location of the traveler exiting the vehicle and in response to failing to receive the second communication:

determining that the trip has concluded based on the detected loss of signal and the failed second communication:

calculating, by the transit system computer processor, a fare based on the GPS coordinates of the mobile electronic device during the first communication, the GPS coordinates of the mobile electronic device during the second communication and a fare structure, or, by detecting the loss of signal;

submitting, by the transit system computer processor, a transaction request for the fare to an issuer of the payment instrument;

charging, by the issuer of the payment instrument, the fare based on the transaction request;

determining, by a mobile application associated with the mobile electronic device, in real-time, an estimated fare based on the GPS coordinates ascertained by the mobile electronic device during the first and second communications;

displaying, by the mobile application, the estimated fare on the mobile electronic device;

receiving, by the mobile application, the fare charged to the payment instrument;

comparing, by the mobile application, the submitted transaction request with the estimated fare; and automatically submitting, by the mobile application, a dispute to the issuer of the payment instrument when the fare charged deviates from the estimated fare outside of a margin of error.

7. The method of claim 6, wherein the first communication further comprises identification information for the traveler.

8. The method of claim 7, further comprising:
the transit system computer processor verifying the identity of the traveler based on the identification information.

9. The method of claim 6, wherein the identification information comprises at least one traveler biometric.

10. The method of claim 9, wherein the at least one traveler biometric is received from biometric sensing equipment of the vehicle.

11. The method of claim 6, further comprising:
the transit system computer processor communicating the fare to the mobile electronic device.

12. The method of claim 6, further comprising:
the transit system computer processor receiving a dispute notification from the issuer of the payment instrument.

* * * * *